United States Patent [19]
Meinhardt et al.

[11] Patent Number: 6,042,227
[45] Date of Patent: Mar. 28, 2000

[54] HOT MELT PHASE CHANGE INK CONTAINING DIELS-ALDER POLYMERIZATION PRECURSOR

[75] Inventors: Michael B. Meinhardt; Clifford R. King, both of Salem, Oreg.

[73] Assignee: Xerox Corporation, Stamford, Conn.

[21] Appl. No.: 09/081,919

[22] Filed: May 19, 1998

[51] Int. Cl.⁷ .......................... C09D 11/02; C09D 11/10
[52] U.S. Cl. .................. 347/99; 106/31.29; 106/31.61
[58] Field of Search .................. 347/99, 95, 100, 347/88; 106/31.27, 31.29, 31.6, 31.61

[56] References Cited

U.S. PATENT DOCUMENTS

| | | | |
|---|---|---|---|
| 4,167,510 | 9/1979 | Brendle | 260/174 |
| 4,310,644 | 1/1982 | Miley | 525/507 |
| 4,665,146 | 5/1987 | Tortorello et al. | 526/304 |
| 5,231,135 | 7/1993 | Machell et al. | 525/123 |
| 5,385,957 | 1/1995 | Tobias et al. | 347/99 X |
| 5,507,839 | 4/1996 | Tanaka | 8/493 |
| 5,688,312 | 11/1997 | Sacripante et al. | 106/31.49 |
| 5,693,128 | 12/1997 | Sacripante et al. | 106/31.27 |
| 5,698,017 | 12/1997 | Sacripante et al. | 106/31.49 |
| 5,700,316 | 12/1997 | Pontes et al. | 106/31.58 |
| 5,844,020 | 12/1998 | Paine et al. | 347/99 X |
| 5,952,402 | 9/1999 | Paine et al. | |

FOREIGN PATENT DOCUMENTS 0761117 7/1995 Japan .

OTHER PUBLICATIONS

Reversible Gelation of Polyoxazoline by Means fo Diels–Alder Reaction Yoshiki Chujo, Kazuki Sada, and Takeo Saegusa.

Thermoreversible Reactio of Diels–Alder Polymer Composed of Difurufyladipate with Bismaleimidodiphenylmethane, Kuramoto, Hayashi, Nagai.

Polymers that Come Apart at Relatively Low Temperatures, Chem Tech, 4–95.

Rheological, Thermo–Mechanical and Viscoelastic Requirements of a Phase Change Ink for an Offset Ink Jet Printing Process, Bui, Frame, Titterington, Jaeger.

Primary Examiner—Richard Moses
Attorney, Agent, or Firm—Ralph D'Alessandro

[57] ABSTRACT

A phase change ink carrier composition is disclosed which includes a Diels-Alder polymerization precursor wherein the composition forms a low viscosity liquid at temperatures in the range from about 90° C. to at least about 160° C., and forms a malleable material at temperatures from about 40° C. to about 80° C., and a solid at temperatures less than about 30° C.

22 Claims, No Drawings

HOT MELT PHASE CHANGE INK CONTAINING DIELS-ALDER POLYMERIZATION PRECURSOR

BACKGROUND OF THE INVENTION

1. Field of the Invention

The present invention relates to selected phase change ink carrier compositions and phase change ink compositions containing those carrier compositions. In particular, the present claimed invention relates to a phase change ink composition containing a phase change ink carrier composition and at least one compatible colorant wherein the phase change ink carrier composition contains a Diels-Alder polymerization precursor (e.g. a dienophile) that is applied to a liquid intermediate transfer surface layer or directly onto a final receiving surface which contains a second Diels-Alder precursor (e.g. a diene). These Diels-Alder precursors react at temperatures from about 0° C. to about 160° C. to form a solid durable polymer at temperatures from about 20° C. to 60° C.

2. Brief Description of the Relevant Art

Phase change inks in digital printing applications (also sometimes called solid inks, or hot melt inks ) have in the past decade gained significant consumer acceptance as an alternative to more traditional printing systems such as offset printing, flexographic printing, gravure printing, letter press printing and the like. Phase change inks are especially desirable for the peripheral printing devices associated with computer technology, as well as being suitable for use in other printing technologies such as gravure printing applications as referenced in U.S. Pat. No. 5,496,879 and German Patent publications DE 4205636AL and DE 4205713AL assigned to Siegwerk Farbenfabrik Keller, Dr. Rung and Co.

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media or an intermediate transfer surface, they quickly solidify to form a predetermined pattern of solidified ink drops.

These solid inks are easy to use and safe. They can be easily loaded into the printer by the user, generally in the form of solid sticks of yellow, magenta, cyan and black ink having a solid consistency similar to children's crayons. Inside the printer, these inks are melted at an elevated temperature in a print head having a number of orifices, through which the melted ink will be ejected onto the desired final receiving substrate or media, such as paper or an overhead transparency film. Alternatively, the melted ink may be applied to a liquid coated rotating drum and then transferred to the substrate. As the ink cools on the substrate, it re-solidifies into the desired image. This resolidification process, or phase change, is instantaneous and a printed, dry image is thus made upon leaving the printer, which is available immediately to the user.

These phase change inks contain no solvents or diluents that can lead to undesired emissions. In all, the use and specific design of the phase change ink addresses many of the limitations of more traditional ink and printing processes. Specifically, the development of phase change inks has favorably addressed the environmental issues of source reduction, pollution prevention, emission standards, ground water contamination, airborne particulates, waste abatement, worker and consumer exposure, and non-reusable consumables.

Furthermore, because the ink is in cool, solid form at any time when the user can actually come in contact with the ink, and the ink is in a molten state only inside the printer and therefore inaccessible to the user, it is safe to use. These inks also have long-term stability for shipping and storage. Moreover, phase change inks are relatively safe to manufacture.

The phase change inks generally comprise a phase change ink carrier composition, which is combined with at least one compatible phase change ink colorant. The carrier composition has been generally composed of resins, fatty acid amides and resin derived materials. Also, plasticizers, waxes, antioxidants and the like have been added to the carrier composition. Generally the resins used are water-insoluble and the carrier composition contains no ingredients that are volatile at the jetting temperatures employed. Also, these carrier ingredients should be chemically stable so as not to lose their chemical identity over time and/or under elevated temperature conditions.

Preferably, a colored phase change ink will be formed by combining the above described ink carrier composition with compatible subtractive primary colorants. The subtractive primary colored phase change inks of this invention employ four component dyes, namely, cyan, magenta, yellow and black. U.S. Pat. Nos. 4,889,560 and 5,372,852 teach the subtractive primary colorants employed and typically may comprise dyes from the classes of Color Index (C.I.) Solvent Dyes, C.I. Disperse Dyes, modified C.I. Acid and Direct Dyes, and a limited number of C.I. Basic Dyes. Also suitable as colorants are appropriate polymeric dyes, such as those described in U.S. Pat. No. 5,621,022 and those available from Milliken Chemical such as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, and uncut Reactint Violet X-80 or those described in U.S. Pat. No. 5,231,135. Colored resin reaction products as described in U.S. patent application Ser. No. 08/672,617 filed Jun. 28, 1996 and assigned to the assignee of the present invention are also suitable colorants.

The specific choice of ingredients and their relative amounts is of critical importance in achieving the desired application performance properties of the phase change inks. Specific physical and chemical properties looked for in these inks include, but are not limited to viscosity, surface tension, flexibility, durability, thermal stability and the ability to deliver color.

In particular, two desired properties of phase change inks are (1) the durability of printed images and (2) the jettability of the ink to produce images on a substrate. Separately, polymeric materials are also added to the carrier composition to achieve the desired durability.

The following U.S. Patents teach specific phase change ink compositions.

U.S. Pat. No. 5,372,852 teaches that the selective phase change ink compositions described therein contain a phase change carrier composition comprising a fatty amide-containing material (either a tetra-amide compound or mono-amide or mixtures thereof). This patent further teaches the preferred tetra-amide compounds are made by reacting a fatty acid, a diamine (ethylene diamine) and a dimer acid. The preferred fatty acid is stearic acid and the preferred dimer acid is a hydrogenated oleic acid dimer product known as EMPOL 1008 Dimer Acid, manufactured by the Emery Division of Henkel Corporation of Cincinnati, Ohio. The preferred mono-amides are taught to be secondary mono-amides, such as behenyl behenamide and stearyl stearamide, products that are made under the KEMAMIDE trademark by Witco Chemical Company.

The pending U.S. patent application assigned to the assignee of the present invention discloses a number of urethane, urea, and mixed urethane/urea resins appropriate for use in phase change ink compositions, as do co-pending applications Ser. Nos. 08/672,816; 08/671,998; 08/672,815; 08/678,386 all filed on Jun. 28, 1996 and U.S. Pat. No. 5,750,064; all assigned to the assignee of the present invention.

While the phase change ink composition described by the above-noted U.S. Patents have met with great commercial success, there is always a need to improve those inks for more demanding processing conditions and different applications. Besides their performance on the printed substrates, inks and the individual components that go into them must be also measured by their cost and ease of manufacturing as well as how they work in a particular printer. Furthermore, the safety and environmental concerns for each component, as well as the ink in total, must be determined. The ideal phase change ink for a plain paper printer is one that encompasses the best qualities from all printing technologies.

Separately, the Diels-Alder reaction (also called the 4+2 cycloaddition reaction) is a well known technique for the synthesis of six membered rings. This reaction involves the 1,4-addition of the double bond of a dienophile to a conjugated diene to generate a six-membered ring. While this reaction has been used often to make relatively low molecular weight materials, it has been extended to polymeric materials. Furthermore, the selection of the diene and dienophile can include cyclic, heterocyclic and highly substituted materials containing complex functional groups and/or protected or latent functional groups. Diels-Alder adducts are typically stable.

Japanese Published Patent Application (Kokai) No. 07/61, 117 (published on Mar. 7, 1995) teaches an ink jet recording method that uses a Diels-Alder reaction. However, this Diels-Alder reaction product is not a polymeric product.

Noriyuki Kuramoto et al. in "Thermoreversible Reaction of Diels-Alder Polymer Composed of Difurfurylapidate with Bismaleimidodiphenylmethane"; *Journal of Polymer Science, Part A: Polymer Chemistry: Volume* 32, pages 2501–2504 (1994) discusses several thermoreversible reactions of different Diels-Alder polymers as well as studies the subject reaction in detail. This class of polymers can be formed by a Diels-Alder reaction at 60° C., yet will depolymerize by heating at 90° C.

Co-pending U.S. patent application Ser. No. 09/065,378 filed Apr. 23, 1998, assigned to the assignee of the present invention teaches use of a thermally reversible Diels-Alder reaction to obtain printed image durability comparable to electrophotograhic imaging systems while avoiding the use of polymeric materials in the jetted ink.

However, none of the prior ink formulations possess the properties of a low viscosity liquid in the molten state and the properties of a non-thermally reversible polymer in the printed state while being implementable in a two component Diels-Alder reactive printing system.

BRIEF SUMMARY OF THE INVENTION

The present invention is based on the discovery of a class of components useful in ink jet printing applications which react and at room temperature are solid polymers, but contain no polymeric materials in the carrier ink composition. These materials are non-volatile, low viscosity components that permit the ink to be easily jetted. Furthermore, after the ink has been jetted onto an intermediate transfer layer, the first Diels-Alder polymerization precursor comes into contact with a second Diels-Alder polymerization precursor and undergoes a chemical reaction to form a solid polymer of good durability when transfixed onto the receiving substrate. As the image cools, the reaction proceeds further to create a polymeric material which enhances the durability of the image on the receiving substrate.

The use of this class of reaction product allows for a phase change ink that can be stored as a solid at room temperature, is a low viscosity liquid at elevated temperatures, and yet when it is jetted onto an intermediate transfer layer and it comes in contact with a polymer precursor within the intermediate transfer layer, a chemical reaction to form a solid polymer of good durability on the receiving substrate readily occurs. As the reaction proceeds further, the polymeric material continues to form enhancing the durability of the image on the substrate.

This new class of carrier ingredients, besides being useful with a wide variety of other known carrier ingredients, generally has very low vapor pressures and hence the ingredients are unlikely to generate undesired volatiles. Also, this class of reaction product is preferably water-insoluble.

Accordingly, one aspect of the present invention is directed to a phase change carrier composition comprising a first Diels-Alder polymerization precursor that forms a non-volatile low viscosity carrier composition at temperatures from about 80° C. to about 160° C. and are solids when at ambient room temperatures (i.e. less than about 20° C. to about 30° C.).

Another aspect of the present invention is a release layer containing a second polymerization precursor suitable to undergo a Diels-Alder reaction with the first polymerization precursor in the ink carrier composition.

Another aspect of the present invention is directed to phase change inks that contain a phase change carrier composition and at least one compatible colorant wherein said carrier composition includes a Diels-Alder polymerization precursor.

Still another aspect of the present invention is directed to hot melt gravure inks and the like which contain Diels-Alder polymerization precursors.

Furthermore, one preferred aspect of the present invention is directed to a phase change carrier composition comprising a Diels-Alder polymerization precursor such as the difurfuryl ester of dimer acid. Solid polymers can be made from this material by reaction with a dienophile compatible with a liquid intermediate transfer layer. An example of such a liquid layer compatible material would be cylcohexanedimethanol divinyl ether. These polymerization precursors undergo a Diels-Alder reaction at about 0° C. to about 160° C.

It is a feature of the present invention that Diels-Alder polymerization precursors can be added to existing amide based phase change inks or can replace entirely other ingredients, for example the tetra-amide component, of such inks to obtain improved durability and toughness, as well as a lower coefficient of friction when applied to substrates that slide over glass or metal surfaces.

It is an advantage of the present invention that the Diels-Alder polymerization precursors can be tailored to achieve the desired properties and, when incorporated into a phase change ink, are compatible with the ink base and impart similar properties to the image printed with the ink.

It is another advantage of the present invention that the Diels-Alder reaction product, when added to a phase change ink formulation, can accomplish the tailoring or design engineering of desired properties in the resulting ink.

These and other aspects, features, and advantages are obtained from a class of Diels-Alder polymerization precursors that are non-volatile and, when formulated into carrier compositions, are low viscosity liquids that can be applied separately in a printing process and, when mixed, readily undergo a chemical reaction to form a solid polymer with good durability. The precursors are applied separately, for example, a first precursor being applied such as by wicking or spraying onto an intermediate transfer surface or directly onto a final receiving substrate and the other precursor being jetted, sprayed, or otherwise applied into contact with the first precursor.

DETAILED DESCRIPTION OF THE PREFERRED EMBODIMENTS

The expression "Diels-Alder polymerization reaction precursor" or "Diels-Alder polymerization precursor" as used in the present specification and claims refers to any diene or dienophile, formulated into a phase change ink carrier composition, that is capable of undergoing a Diels-Alder reaction with a second dienophile or diene (respectively) upon admixture at about 20 to 60° C. when formulated with other components in the carrier composition. By definition the diene or dienophile, as the terms are used herein, must be capable of chain extending polymerization. For the purposes of this invention, the terms diene and bis-diene are synonymous For example, the diene portion of the Diels-Alder polymerization precursor could be added into a molten phase change carrier composition or phase change ink composition. When contacted with the dienophile portion of the polymer precursor resident in the liquid intermediate transfer layer, admixture of the diene and dienophile permits a Diels-Alder reaction to form a high molecular weight resinous material that is a Diels-Alder adduct. Furthermore as the reaction proceeds to completion over time, the polymer creates a durable ink on the receiving substrate. Alternatively, the diene portion of the Diels-Alder polymerization precursor may be formulated into the intermediate transfer layer and the dienophile may be formulated into phase change ink or phase change ink carrier composition such that, when the dienophile containing phase change ink or phase change carrier composition is jetted onto the liquid intermediate transfer layer, substantially the same result is achieved. The resulting polymer would not be a thermally reversible polymer.

Also, the phase change ink carrier composition formulated with either the Diels-Alder polymerization precursor diene or dienophile would be in solid form when the ink sticks are inserted by the user into the ink jet printer. In this embodiment, the phase change ink carrier composition containing the Diels-Alder polymerization precursor diene or dienophile becomes a liquid at the jetting temperatures and then reacts to form a solid polymer when cooled in image form upon the substrate.

It should be noted the Diels-Alder reaction products covered by this definition may be the reaction products of more than one Diels-Alder reaction or the reaction sequence need not be limited to a single Diels-Alder reaction or that reaction be neither the first nor the last reaction in the overall reaction sequence. And, of course, this definition includes the combination of one or more Diels-Alder precursors with a Diels-Alder reaction product or a mixture of different Diels-Alder reaction products within a phase change ink. Other possibilities include chain terminating components for molecular weight control, symmetrical or non-symmetrical dienes or dienophiles, and combinations thereof.

This definition includes Diels-Alder polymerization precursors that undergo a non-thermally reversible reaction over the temperature range of about 0° C. to about 160° C. The preferred dienes and dienophiles used as Diels-Alder polymerization precursors are bis-dienes and bis-dienophiles, respectively.

The term "solid" as applied to polymeric forms of the reaction product at temperatures below about 40° C. refers to any solid form that results from the reaction of precursors which are suitable for use to create an image both as in an ink jet printer apparatus and as a dry printed image on a substrate such as plain paper.

The term "low viscosity liquid" as applied to liquid forms of the molten carrier composition from 90° C. to about 160° C. refers to any suitable liquid state that is jettable in an ink jet printer. In the context of the print process discussed herein employing indirect transfer printing, the Diels-Alder reaction creates an adduct that is incorporated into a phase change ink which, as it starts to polymerize while it passes through its cooling temperature range of between about 80° C. to about 40° C., becomes more viscous and exhibits malleable characteristics. As the ink further cools to an ambient temperature less than about 20° C. to about 30° C., it further hardens in the printing process to produce a tough and durable image when printed on its final receiving substrate. Tailoring of the Diels-Alder adduct and the resulting ink in which the adduct is employed permits the design engineering of certain desired properties in both the adduct and the ink. For example, placing a straight chain hydrocarbon link, such as a polyethylene chain, between the reactive diene units or moieties will produce a more crystalline and harder, more durable material. In contrast, utilizing a polyoxyalkylene moiety between the reactive units will produce a softer, flexible product with a lower glass transition temperature ($T_g$). Naturally, a key factor in the use of any dienes or dienophiles in phase change ink formulations is the compatibility of the compound with the ink base.

For the purposes of this invention "liquid intermediate transfer layer" means any material that serves as a sacrificial intermediate layer between a jetted phase change ink and the receiving sheet upon which the image is recorded. Examples of materials capable of participating in Diels-Alder polymerization reactions that are likely to be compatible with liquid intermediate transfer layers such as silicone oils would include 1,3-divinyl-1,3-diphenyl-1,3-dimethyldisiloxane, 1,5-divinyl-3-phenylpentamethyltrisiloxane, and the like. These bis-vinylogous materials are available commercially from Gelest, inc. of Tullytown, Pa. 19007.

In addition to liquid intermediate transfer layers formulated from silicone oils, other possibilities providing the needed film-splitting functionality are apparent to those skilled in the art including, but not limited to, other silicon-containing compounds, petroleum derivatives and other natural products.

In general, a first Diels-Alder polymerization precursor in a phase change carrier composition is jetted onto a liquid intermediate transfer layer containing a second Diels-Alder polymerization precursor.

Intermediate transfer layers capable of forming compatible mixtures with dienes or dienophiles in this invention and maintaining good film splitting properties are preferred. Generally, vegetable and natural product derived oils and waxes, or synthetic oils such as petroleum derived or modified oils and waxes may be employed.

Preferably, intermediate transfer layers using natural oils such as soya oil, linseed oil, or carnauba oils may be employed. In addition thickened and gelled white mineral oils such as Geahlene® hydrocarbon based materials available commercially from Penreco of Karns City, Pa. may be used as liquid intermediate transfer layers. Further commercially available materials include the MagieSol® series of technical white oils and the Inkols® series of fluids, available from Magie Brothers Oil Company of Franklin Park, Ill., may be used. Most preferably, mineral oils such as those available commercially under the tradename Nujol are employed.

In addition, synthetic oils such as silicone waxes and oils may be employed as the liquid intermediate transfer layer or as compatibilizing additives. For example, poly (C20–C24 alkylmethylsiloxane) polydimethylsiloxane, an alkyl substituted polysiloxane commercially available from PCR, Inc. of Gainesville, Fla., can serve as a diene or dienophile compatibilizing fluid. More preferably, silicone fluids, such as the Dow-Corning 200 series fluids, available from Dow-Corning of Midland, Mich. may be employed. Most preferably, the liquid intermediate transfer fluid is Dow-Corning 200 Fluid.

As stated above, the Diels-Alder reaction involves the reaction of a diene and dienophile. For purposes of this invention, suitable dienes and dienophiles may be any such materials capable of participating in a Diels-Alder reaction that are not likely to undergo a reverse or "retro" Diels-Alder reaction at a temperature likely to be encountered in a typical user's environment. Dienes will be understood to be any conjugated diene in which the two double bonds are separated by a single bond and the dienophiles are double bonded compounds. For polymerization, a requirement of the diene and dienophile molecules is they contain at least two diene or dienophile reactive sites, respectively, separated by one or more connecting groups. Moreover, the Diels-Alder polymerization reaction products could encompass linear co-polymers, branched chain polymers or co-polymers, block co-polymers, star or dendrimeric polymers, or polymers having functionalized termini. Also, these polymers may be covalently bonded to colorant materials (e.g. Milliken polymeric colorants capped with a diene or dienophile); UV or IR absorbers, anti-oxidants, fungicides and the like. The use of such bifunctional materials could provide a particular desired feature (e.g. specific color, enhanced lightfastness, conductivity, oxidative stability, environmental resistance or biodegradability, or recyclability and the like). Alternatively, the connecting groups between the diene groups or dienophile groups in the precursor molecules may be modified to provide other features and/or properties to the phase change ink. For example, it may be possible to incorporate functionalities into these precursor molecules that provide desired color, anti-oxidation, toughening, UV stabilization, infrared absorption, plasticization and other properties. In particular, it may be desirable to design these precursors to achieve desired glass transition temperatures ($T_g$), melting points, yield stresses, moduli and heats of fusion.

More preferably, the diene precursor may consist of any 5- to 8-membered ring containing a conjugated diene wherein all of the ring members are either carbon atoms or a mixture of carbon atoms with hetero atoms selected from nitrogen, oxygen, sulfur and mixtures thereof in the conjugated diene system. And preferably, these ring atoms may be unsubstituted or contain electron donating substituents (e.g., alkyl, aryl, arylalkyl, alkoxy, aryloxy, alkylthio, arylthio, amino, alkyl-substituted amino, aryl-substituted amino, alkoxy-substituted amino groups and the like). Also, the connecting portion between terminal diene moieties may be selected from natural or synthetic fatty acids, (particularly hydrogenated fatty acids which are di-basic and contain 4 to 50 carbon atoms), a homopolymer or copolymer of alkyleneoxy constituents ranging from 1 to 100 repeating units, or similar design engineered functionality to balance the softness of the incipient polymer.

Most preferably, the diene is difurfuryladipate (DFA) or the difurfuryl ester of dimer acid.

More preferably, the dienophile may consist of any unsaturated moiety capable of undergoing a Diels-Alder reaction. Preferably, the dienophile can be unsubstituted or substituted with electron withdrawing groups such as cyano, amido, carboxy, carboxy ester, nitro or aromatic rings containing electron withdrawing groups. Alternatively, the dienophile may be a double bond within a ring structure that is conjugated with one or more electron withdrawing groups. A requirement for chain polymerization is that the dienophile contains a connecting portion between two dienophile moieties, the connecting portion being selected from natural and synthetic di-basic acids containing from 4 to 50 carbon atoms, diamines separated by a carbon chain length ranging from 2 to 50 carbon atoms, aromatic diamines, bi-aryl diamines, or alkyleneoxy diamines (represented commercially by the Jeffamines from Huntsman Chemical). Divinyl silyl compounds are suitble dienophiles.

Most preferably, the dienophile is cyclohexanedimethanol divinyl ether.

The reaction of these dienes and dienophiles into the polymerization reaction product can occur according to reaction conditions generally employed for Diels-Alder reactions.

The use of Diels-Alder polymerization precursors has the important advantage that these materials are liquid and non-polymeric in nature at the jetting temperatures and will not cause poor jetting operation or a catastrophic failure of the print head, such as by nozzle clogging. And, they have the additional advantage of forming a durable image because of their polymeric nature at room or ambient temperatures. Moreover, the Diels-Alder polymerization precursors of the present invention are generally thermally stable (i.e. do not degrade by alternate or undesired mechanisms) for use in the hot melt print head, are generally mutually compatible with other conventional phase change ink jet carrier and colorant materials, and are generally inert so as to meet environmental and consumer safety concerns.

In the present imaging system the Diels-Alder polymerization precursors are more preferably used in an indirect printing process. For example, one precursor could be formulated into an offset ink while the other precursor could be formulated into the material used as the release layer in the offset process. Polymerization would occur during either the transfixing step or the post processing step of the offset printing process.

Preferably, this invention comprises selective phase change ink compositions for use in a process by which such compositions are indirectly applied via an intermediate transfer surface to a final receiving surface or substrate. These preferred phase change ink compositions of the instant invention comprise a specific phase change ink colorant and a specific phase change ink carrier composition that contains at least one Diels-Alder polymerization precursor. The specific phase change ink carrier composition is formulated so that it produces a selective ink composition having predetermined fluidic and mechanical properties which meet the parameters required for the indirect application via an intermediate transfer surface of the ink composition to a final receiving substrate.

The colorant employed in the phase change ink compositions of the present invention may be any subtractive primary colorant compatible with the particular phase change ink carrier composition employed. The subtractive primary colored phase change inks of this invention generally comprise dyes of the four primary component colors, namely, cyan, magenta, yellow and black. The dyes employed as subtractive primary colorants may be dyes from the following dye classes: Color Index (C.I.) dyes; solvent dyes; disperse dyes; modified acid and direct dyes; basic dyes. Besides these classes of dyes the ink compositions of the present invention preferably also include selected polymeric dyes as one or more colorants. Suitable polymeric dye colorants are disclosed in U.S. Pat. No. 5,621,022 and in U.S. patent application Ser. No.08/672,617 filed Jun. 28, 1996.

Synthesis of organic chromophores appropriate for use in suitable polymeric dye colorants containing polyoxyalkylene substituents are disclosed in Kuhn, U.S. Pat. No. 3,157,633, Brendle, U.S. Pat. No. 4,167,510, Cross et al., U.S. Pat. No. 4,284,729, and Baumgartner et al., U.S. Pat. Nos. 4,732,570, and 5,231,135 incorporated by reference herein in their entireties.

Suitable polymeric colorants are available from Milliken Chemical. Examples include Milliken Ink Yellow 869, Milliken Ink Blue 92, Milliken Ink Red 357, Milliken Ink Yellow 1800, Milliken Ink Black 8915-67. Other yellow, cyan, magenta and black polymeric dyes are within the scope of this invention and may be utilized. These polymeric dyes may be used alone or in combination with conventional colorants disclosed in U.S. Pat. No. 5,372,852 to make individual phase change inks of each primary color. In addition, phase change inks that contain polymeric dyes may be used in a ink jet printer with phase change inks that contain conventional powdered dyes.

Various modifying agents can preferably be added to a phase change ink carrier composition.

These include fatty acid amide-containing materials such as tetra-amide compounds, hydroxyl-functional tetra-amide compounds, mono-amides and hydroxyl-functional mono-amides, and mixtures thereof. The preferred tetra-amides and mono-amides are described in the above-noted U.S. Patents, which are incorporated herein by reference.

The preferred hydroxyl-functional tetra-amide compounds for producing the modified phase change ink carrier composition are dimer acid-based tetra-amides which preferably include the reaction product of a hydroxyl-functional fatty acid, a diamine e.g. (ethylene diamine) and a dimer acid or the reaction product of a fatty acid, a diamine (e.g. ethylene diamine) and a hydroxyl-functional dimer acid. As used in the present specification, the term "hydroxyl-functional fatty acid amide-containing material" refers to a compound having hydroxyl groups and a fatty acid amide moiety. A preferred hydroxyl-functional fatty acid precursor is 12-hydroxy stearic acid. For purposes of this invention, the term "dimer acid" preferably means a hydrogenated oleic acid dimer product. A preferred example of such a dimer acid is a product known as EMPOL 1008 Dimer Acid, manufactured by the Emery Division of Henkel Corporation of Cincinnati, Ohio. Fatty acids having from 10 to 22 carbon atoms are preferably employed in the formation of the dimer acid-based tetra-amide. These dimer acid-based tetra-amides are produced by Union Camp and comprise the reaction product of ethylene diamine, dimer acid, and the following fatty acids: decanoic acid (Union Camp X3203-23), myristic acid (Union Camp X3202-56), stearic acid (Union Camp X3138-43, X3164-23, X3202-44, X3202-46, X3 222-655, X3261-37, X3261-53, and X3290-72), and docosanoic acid (Union Camp X3202-36). For the purposes of this invention, the most preferred dimer acid based tetra-amide is the reaction product of dimer acid, ethylene diamine and stearic acid in the stoichiometric ratio of 1:2:2. Stearic acid is the preferred fatty acid reactant because its adduct with dimer acid and ethylene diamine has the lowest viscosity of the dimer acid based tetra-amides. Its ingredients also are the most readily available and, therefore, lowest in cost.

The hydroxyl-functional fatty acid amide-containing material may also preferably comprise a hydroxyl-functional mono-amide. In fact, in the preferred case, the phase change ink carrier composition comprises both a hydroxyl-functional tetra-amide compound and a hydroxyl-functional mono-amide compound. The hydroxyl mono-amide compound typically comprises either a hydroxyl-functional primary or secondary mono-amide, but is preferably a hydroxyl-functional secondary mono-amide. Of the primary mono-amides, hydroxy stearamide, can be employed herein. As for the secondary mono-amides, hydroxyl-functional behenyl behenamide and hydroxyl-functional stearyl stearamide, are useful hydroxyl functional mono-amides.

The preferred hydroxyl-functional fatty acid amide-containing compounds comprise a plurality of fatty acid amide materials, which are compatible with each other. Typically, even when a plurality of hydroxyl-functional fatty amide-containing compounds are employed to produce the phase change ink carrier composition, the carrier composition has a substantially single melting point transition. The melting point of the phase change ink carrier composition is preferably at least about 85° C. Other preferred modifying agents include certain tackifiers. The preferred tackifiers encompass those that are compatible with fatty amide-containing materials. These include, for example, KE-100, a glycerol ester of hydrogenated abietic (rosin) acid made by Arakawa Chemical Industries, Ltd., Foral 85, a glycerol ester of hydrogenated abietic (rosin) acid, Foral 105, a pentaerythritol ester of hydroabietic (rosin) acid, Cellolyn 21, a hydroabietic (rosin) alcohol ester of phthalic acid, all manufactured by Hercules Chemical Company, Nevtac 2300 and Nevtac 80, synthetic polyterpene resins manufactured by Neville Chemical Company, and Wingtack 86, a modified synthetic polyterpene resin manufactured by Goodyear Chemical Company. The most preferred tackifier, however, is KE-100.

Another of the preferred modifying agents that can be added to the formulation are certain plasticizers. For instance, many of the phthalate ester plasticizers sold by Monsanto under the traded name "Santicizer" are suitable for this purpose. However, the preferred plasticizer is Santicizer 278, which is the mixed di-ester of phthalic acid with benzyl alcohol and "Texanol".

Other additives may be combined with the phase change ink carrier composition. In a typical phase change ink chemical composition antioxidants are added for preventing discoloration of the carrier composition. The preferred antioxidant materials can include Irganox 1010 manufactured by Ciba Geigy; and Naugard 76, Naugard 445, Naugard 512, and Naugard 524 manufactured by Uniroyal Chemical Company. However, the most preferred antioxidant is Naugard 445.

Viscosity reducing agents may also be employed in the ink compositions of the present invention. Use of a viscosity reducing agent allows the viscosity of the ink composition to be adjusted to a desired value. Suitable viscosity reducing agents for use in ink compositions of the present invention include stearyl stearamide, stearyl monoethanolamide stearate, and ethylene glycol distearate (EGDS). The viscosity reducing agent may be present in an amount of from about 0 to about 50% by weight of the ink composition. Again, the specific amount of viscosity reducing agent used in a given ink composition depends on the viscosity desired by the user.

A hardening agent may also be used in the ink compositions of the present invention to obtain ink having a desired hardness at room temperature. Useful hardening agents include ricinoleamides, hydroxystearamides, hydrogenated castor oil, EGDS (ethylene glycol distearate), esters of ethylene glycol, esters of propylene glycol, esters of glycerol, stearyl esters of 12-hydroxystearic acid, and hydroxy acids, such as 12-hydroxydodecanoic acid and derivatives thereof.

Ricinoleamides and hydroxystearamides may be preferably employed as the hardening agent, with N(2-hydroxyethyl)-12-hydroxystearamide (trademark Paricin 220 from CasChem, Inc.) being most preferred. Other suitable hydroxystearamides include Paricin 210, and Paricin 285, available from CasChem, Inc. These compounds substantially harden the ink composition at room temperature, yet maintain the ink composition in the liquid stage.

Viscosity reducing agents and/or hardening agents may or may not need be employed in the ink composition of the present invention.

While the modifying agents mentioned above may be used for the certain preferred embodiments of this invention, other materials with similar properties can be combined with or used to produce different phase change ink compositions with mechanical and fluidic properties similar to those outlined above. These other materials can include paraffins, microcrystalline waxes, polyethylene waxes, ester waxes, oligomers or low molecular weight polymers and copolymers such as poly-ethylene vinyl acetate (EVA), ethylene/acrylic acid copolymers, EVA/acrylic acid copolymers, ionomers, copolymers of acrylic acid with polyamides, and the like.

Thin films of uniform thickness of the phase change ink composition on the final receiving substrate when cooled to the ambient temperature must be ductile and retain sufficient flexibility so the image will not fracture upon bending, while possessing a high degree of lightness, chroma, transparency and thermal stability.

It has been determined in an indirect application process employing an intermediate transfer surface that a phase change ink composition must have certain fluidic and mechanical properties in order to produce a printed substrate of high quality. These desirable properties of the phase change ink compositions of this invention in the solid state are specified and measured by using several analytical techniques. One such technique is dynamic mechanical analysis (DMA). DMA is a technique described in U.S. Pat. No. 5,389,958.

Another of the mechanical analytical techniques mentioned above is compressive yield testing on bulk samples of the phase change ink compositions. Yield stress is the point on the stress-strain curve at which the material continues to deform without an increase in stress. This is important in the printing process mentioned above since it determines the pressure needed to spread the solid, malleable ink droplets into a continuous thin film during the transfer process.

There are various types of deformation the ink undergoes in compression as a function of temperature or rate. An ink can be classified as being brittle if the ink fails by shearing and fracturing intermolecular bonds. This is typified by low elongation (which is directly proportional to strain) and moderate to high stress. Since the integration of the area under the stress-strain curve is a measure of the toughness of the material, a brittle material is strong, but not tough. The brittle behavior is detrimental to the durability of the ink on substrates because it is both low in elongation (i.e., not very ductile or flexible) and toughness (i.e., the ability to dissipate energy). The materials of this invention are anticipated to have excellent durability, ductility, and toughness.

The phase change ink compositions as finally applied to the substrate make a finished print exhibiting excellent color properties. Thin films of uniform thickness of the phase change ink composition are rectilinearly light transmissive and exhibit exemplary $C^*_{ab}$ and $L^*$ values as incorporated by reference from Tektronix' U.S. Pat. No. 5,389,958.

Another important property of phase change inks is viscosity. The viscosity of the molten ink must be matched to the requirements of the ink jet device and optimized versus other physical properties of the ink. For purposes of this invention, the viscosity of the phase change ink is measured on a Bohlin CS-50 rheometer using a C-25 cup and bob. It is preferred that the viscosity of the phase change ink carrier composition at 140° C., and in turn the ink composition of this invention, is from about 5 to about 30 centipoise, more preferably from about 10 to about 20 centipoise, and most preferably from about 11 to about 15 centipoise.

As previously indicated, the subject phase change ink formed from the phase change ink carrier composition exhibits excellent physical properties. For example, the subject phase change ink, like prior art phase change inks, exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidic properties mentioned above when measured by DMA, compressive yield testing and viscometry, and more importantly, work well when used in the indirect printing process described in U.S. Pat. No. 5,389,958 issued Feb. 14, 1995.

The ink utilized in the process and system of the instant invention is preferably initially in solid form and is then changed to a molten state by the application of heat energy to raise the temperature from about 85° C. to about 160° C. The molten ink is then applied in raster fashion from the ink jets in the print head to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forming the intermediate transfer surface on the support surface or drum. This intermediate temperature where the solidified ink is maintained in its malleable state is between about 30° C. to about 80° C. At this temperature, the Diels-Alder polymer is formed.

Once the solid malleable ink image enters the nip, it is deformed to its final image conformation and adheres or is fixed to the final receiving substrate either by the pressure exerted against the ink image on the final receiving substrate by the pressure and fusing roller alone, or by the combination of the pressure and heat supplied by an appropriate heating apparatus. An additional heating apparatus optionally could be employed to supply heat to facilitate the process at this point. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate and be sufficiently deformed to ensure that light is transmitted through the ink image rectilinearly or without significant deviation in its path from the inlet to the outlet, in those instances when the final receiving substrate is a transparency. Once adhered to the final receiving substrate, the ink image is cooled to ambient temperature of about 20° C. to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C.

The coefficient of friction of the ink can affect the ability to perform automatic document feed printed substrates with some imaging apparatuses, such as xerographic or electrophotographic copiers. A high coefficient of friction makes the ink "stickier" and tends to cause the printed media to jam as the media slides across a supporting surface, such as glass. The coefficient of friction is defined as the ratio of the tangential force to the normal load when the surface of the material is moved relative to another surface. For a printed substrate at rest on a supporting surface, the coefficient of friction should be less than about 0.7, more preferably less than about 0.5, and most preferably less than about 0.3 to permit reliable document feeding at the normal operating temperatures. Inks formed utilizing the present invention have now coefficients of friction.

The following examples are illustrative of the phase change ink formulations that may be employed both with and without a liquid intermediate transfer surface, without any intent to limit the invention to the specific materials, process or structure employed. All parts and percentages are by weight unless explicitly stated otherwise.

EXAMPLES

1. Ink Constituents

The following ink formulations are composed of ingredients found in commercially available Tektronix phase change inks, with the exception of the materials described within the current invention. The formulation techniques and ancillary materials have been disclosed in aforementioned Tektronix patents and are incorporated herein in their entirety. The formulation materials include but are not limited to: viscosity modifiers, colorants, dyes, pigments, anti-oxidants, toughening agents, waxes (ester, amide, natural and synthetic such as Polywax 850 polyethylene described in co-pending U.S. patent application Ser. No. 09/033,366 filed Feb. 13, 1998), plasticizers, organoleptic constituents, color developers, resins (urethane, urea and urethane/urea), polymeric colorants, and resins derived from polymeric colorants.

These examples utilize Diels-Alder reaction products and their precursors as formulation ingredients in phase change inks, and these ingredients have been described in the preceding specification of this patent. The ingredients are formulated into phase change inks in the range of 5 to 90% by weight of the total ink formulation. Expected number average molecular weight ranges of the Diels-Alder product is 700 to 25,000.

Diels-Alder reaction adducts are produced from a bis-dienophile and a bis-diene in which the reactive moieties of each component are separated by a connecting group. These reactive components, individually, are characterized by number average molecular weight ranges of 200 to 15,000, most preferably between 200 and 3000. Polymerization of the diene and dienophile is expected to occur at temperature ranges between about 0° C. to about 160° C. and most preferably between about 0° C. and about 60° C. The diene and dienophile are characterized by their melting points, if crystalline, with ranges expected between about 50° C. and about 150° C. or if amorphous, glass transition temperatures ranging from about −25° C. to about 125° C.

2. Ink Formulation

Inks are prepared by melting the desired ingredients in a stainless steel beaker and blending with mechanical agitation. Typical blending temperatures range from 80° C. to 140° C. accomplished using a temperature-controlled mantle and with agitation for about one hour. An aliquot of ink is removed and characterized typically, by a select few physical properties, which include: spectral strength, viscosity, glass transition temperature and melting point. These properties are adjusted by reformulation of the ink, as required, to work in a Tektronix Phaser® color printer or other printing or marking device.

3. Ink Processing

The final inks are filtered through a heated Mott apparatus (available from Mott Metallurgical) using #3 Whatman filter paper and an applied $N_2$ pressure of about 15 psi. The filtered phase change ink is poured into molded HIPSMA (High Impact Polystyrene/Maleic Anhydride) plastic cups or tubs to form ink sticks. The finished solid inks have markedly better surface finishes and better release properties from the plastic cups when compared to comparable formulations without the polyethylene wax additive or the Diels-Alder polymerization precursor.

4. Ink Analysis and Characterization

The final ink products are characterized by the following physical properties: viscosity of about 13 cPs as measured by a Ferranti-Shirley cone-plate viscometer at about 140° C. and adjusted with stearyl stearamide or with the Diels-Alder polymerization precursors of this invention to lower or raise the viscosity respectively, a melting point (expected range 85° C. to 160° C.) as measured by differential scanning calorimetry using a DuPont 2100 calorimeter, and a glass transition temperature (expected range −25° C. to 100° C.) as measured by Dynamic Mechanical Analysis using a Rheometrics Solids Analyzer (RSAII). The spectral strength of the ink is determined using a spectrophotographic procedure based on dissolving the solid ink in butanol or other appropriate solvent and measuring the colorant solution absorbance using a Perkin Elmer Lambda 2S UV/Vis spectrophotometer. Spectral intensity is adjusted as required to meet the printing application.

5. Ink Performance Testing in the Print Head and the Transfixing Process

The inks are evaluated in Tektronix phase change color printers for reliable jetting characteristics in a Tektronix piezo driven print head. Measures include drop mass and jetting frequency response, applied voltage and waveforms employed for ejection. Desired observations include an ink which jets and is capable of producing ink droplets at a useful marking rate. Furthermore, the print head operation is not impeded after several freeze-thaw cycles of print head operation. That is, no orifice clogging or diminished jetting characteristics are observed.

The inks are evaluated for their film splitting characteristics in the offset printing process employed by Tektronix phase change color printers as represented by a Phaser 350 printer. A general description of the physical requirements can be found in L. Bui et al.; "Rheological, Thermo-Mechanical and Viscoelastic Requirements of a Phase Change Ink for an Offset Ink Jet Printing Process"; *Proceedings of the IS&T's Eleventh International Congress on Advances in Non-Impact Printing Technologies,* (1995). The inks are ejected onto the rotating drum containing a sacrificial intermediate liquid transfer layer. The image is then transferred to the desired substrate by the transfixing process. The inks are expected to exhibit >90% transfer from the drum to the substrate as measured by a chase sheet through the print process as a follower after the printed image is prepared. The inks are also evaluated for the absence of cohesive failure between ink layers built up on the rotating drum prior to transfixing. The print process parameters of substrate pre-heat, drum temperature and transfixing pressure are adjusted to optimize the image and print quality of the final printed article and to utilize the latent polymerization characteristics formulated into the ink and in the intermediate release layer.

6. Print and Performance Testing

The inks are tested in a Tektronix Phaser 350 printer, that uses an offset transfer printing system. The inks are found to completely transfer and to give images of good color, print quality and durability either as primary colors or when used in combination with each other or with the commercially available Phaser 350 printer inks.

Prints made from these examples show better blocking resistance at high temperatures when compared to comparable formulations without the Diels-Alder adduct. The blocking test used is described on page 56 of the Proceedings of NIP12: The Twelfth International Congress on Digital Printing Technologies, published in 1996 by the Society for Imaging Science and Technology.

Prints made from the following examples are expected to provide durability features commensurate with laser printer hard copy or prints prepared by aqueous ink jet devices, or commercial offset printing techniques. Quantitative comparisons using a Taber Abrasion method (ATSM D4060) provides an indication of improved durability by the polymeric characteristics of the Diels-Alder adduct forming between the ink and the reactive complimenter in the sacrificial liquid layer. The inks also show improved resistance to cracking when the printed article is folded.

The hard copy output from the inks of this invention provide automatic document feed capability. This is measured by the ability to reproduce a print in a commercial photocopier using the automatic reproduction mode selecting from 1 to 500 prints.

Example 1
Preparation of Bis-Furfuryl Dimer Acid Diester

One mole of hydrogenated dimer acid EMPOL 1008 (available commercially from Henkel Corporation of Cincinnati, Ohio), is converted to the bis-furfuryl diester by reaction with furfuryl alcohol (2.2 moles) and a catalytic amount of 12 N hydrochloric acid. Excess furfuryl alcohol is removed by vacuum distillation to leave a clear to amber yellow residue. This material can serve as the Diels-Alder diene formulated into phase change ink in the following examples.

Example 2
Preparation of Bis-acrylate Esters of Epoxy Resins

Materials as defined in column 5 of U.S. Pat. No. 4,310,644 are evaluated as dienophiles for Diels-Alder adducts useful in phase change inks. The thermal and mechanical stability, chemical resistance, adhesion and reactive sites are tailorable to provide a superior performing phase change ink.

Bisphenol A is reacted with two equivalents of ethylene oxide followed by 10 equivalents of propylene oxide. To this alkoxylated material is further added 6 equivalents of ethylene oxide. The reactions are carried out in anhydrous toluene with catalytic KOH and at temperatures suitable to provide reaction. The resulting material has an hydroxyl number in the range of 104 to 115. This material is treated with two equivalents of glycidyl chloride in the presence of sodium acetate. The material is filtered and stripped under reduced pressure to yield the bisphenol A alkoxylated glycidyl ether. The ether is reacted with two equivalents of acrylic acid to form the bis-acrylate derivative suitable as the dienophile reactant in the present invention.

Example 3
Preparation of a Cyan Ink Containing a Bis-Diene Used in Conjunction with a Bis-Dienophile Incorporated into a Liquid Intermediate Transfer Surface Printing Layer A phase change ink is prepared by mixing about 2.1% by weight of Solvent Blue 44, about 50% of stearyl stearamide, about 25% of the bis-furfuryl diester of dimer acid of Example 1, above, about 22% of a urethane/urea resin described in Example 4 of U.S. patent application Ser. No. 08/627,816, and about 0.2% of Uniroyal Naugard 445 antioxidant. The sacrificial silicone oil used as the intermediate transfer layer is formulated with 0.5 to 5% by weight of 1,5-divinyl- 3-phenylpentamethyltrisiloxane available from Gelest, Inc. of Tullytown, Pa. The ink is printed using a Tektronix Phaser® 350 phase change color printer by jetting the molten ink onto the drum prepared with the bis-dienophile-containing silicone oil. Upon contact with the heated drum, the ink/oil system reacts to provide a polymeric material, localized at the ink/oil interface. The image is transfixed onto a substrate that provides a polymeric material at the surface of the print. This polymeric material imparts desirable mechanical features, such as durability, to the printed article that is evaluated according to the standard procedures.

Example 4
Preparation of a Cyan Ink Containing a Bis-Diene Used in Conjunction with a Bis-Dienophile Incorporated into a Liquid Intermediate Transfer Surface Mineral Oil Printing Layer The Diels-Alder diene contained in the phase change ink described in Example 3 above, is jetted onto a rotating drum coated with a sacrificial, intermediate transfer layer. The sacrificial mineral oil layer used as the intermediate transfer layer is formulated with 0.5 to 5% by weight of cyclohexanedimethanol divinyl ether, a bis-dienophile available from BASF Corp. of Mount Olive, N.J. The ink is printed using a Tektronix Phaser® 350 phase change color printer by jetting the molten ink onto the drum that is prepared with the bis-dienophile-containing mineral oil. Upon contact with the heated drum, the ink/oil system reacts to provide a polymeric material, localized at the ink/oil interface. The image is transfixed onto a substrate that provides a polymeric material at the surface of the print. This polymeric material imparts desirable mechanical features (durability) to the printed article that is evaluated according to the standard procedures.

Example 5
Preparation of a Cyan Ink Containing a Bis-Dienophile Used in Conjunction with a Bis-Diene Incorporated into a Liquid Intermediate Transfer Surface Printing Layer A phase change ink is prepared by mixing about 2.1% by weight of Solvent Blue 44, about 50% of stearyl stearamide, about 25% of the bis-acrylate dienophile described in Example 2 above, about 22% of a urethane/urea resin described in the aforementioned Example 4 of U.S. patent application Ser. No. 08/627,816, and about 0.2% of Uniroyal Naugard 445 antioxidant. The sacrificial silicone oil that is used as the intermediate transfer layer is formulated with 0.5 to 5% by weight bis-furfuryl adipate (Noriyuki Kuramoto et al. in "Thermoreversible Reaction of Diels-Alder Polymer Composed of Difurfurylapidate with Bismaleimidodiphenylmethane"; *Journal of Polymer Science, Part A: Polymer Chemistry: Volume* 32, pages 2501–2504 (1994)), and compatibilized with 1 to 50% of poly(C20–24 alkylmethylsiloxane)polydimethylsiloxane available from PCR, Inc. of Gainesville, Fla. The ink is printed using a Tektronix Phaser® 350 phase change color printer by jetting the molten ink onto the drum prepared with the bis-dienophile-containing silicone oil. Upon contact with the heated drum, the ink/oil system reacts to provide a polymeric material, localized at the ink/oil interface. The image is transfixed onto a substrate that provides a polymeric material at the surface of the print. This polymeric material imparts desirable mechanical features (durability) to the printed article that is evaluated according to the standard procedures.

Example 6

Preparation of a Cyan Ink Containing a Bis-Dienophile Used in Conjunction with a Bis-Diene Incorporated into a Liquid Intermediate Transfer Surface Mineral Oil Printing Layer The phase change ink described in Example 5, is jetted onto a mineral oil intermediate sacrificial transfer layer containing about 0.5% to about 5% of bis-furfuryl adipate. Upon contact with the heated drum, the ink/oil system reacts to provide a polymeric material, localized at the ink/oil interface. The image is transfixed onto a substrate that provides a polymeric material at the surface of the print. This polymeric material imparts desirable mechanical features (durability) to the printed article that is evaluated according to the standard procedures.

While the invention has been described above with reference to specific embodiments thereof, it is apparent that many changes, modifications and variations can be made without departing from the inventive concept disclosed herein. For example, it is understood that the inks disclosed herein may equally well be employed in direct printing applications. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink carrier composition that includes a component that is a Diels-Alder polymerization precursor.

2. The phase change ink carrier composition of claim 1 wherein the Diels-Alder polymerization precursor is a bis-diene.

3. The phase change ink carrier composition of claim 2 wherein the Diels-Alder polymerization precursor is the difurfuryl ester of a dimer acid.

4. The phase change ink carrier composition of claim 1 wherein the Diels-Alder polymerization precursor is a bis-dienophile.

5. The phase change ink carrier composition of claim 4 wherein the Diels-Alder polymerization precursor is an alkoxylated bisphenol A glycidyl diacrylate.

6. The phase change ink carrier composition of claim 1 wherein the Diels-Alder polymerization precursor is contacted with a bis-diene or a bis-dienophile Diels-Alder polymerization precursor to form an imaging composition wherein the composition forms a low viscosity liquid at temperatures in the range from about 90° C. to at least about 160° C., and forms a high viscosity, malleable material at temperatures from about 80° C. to about 40° C. and a solid at temperatures less than about 30° C.

7. A phase change ink composition comprising the phase change ink carrier composition of claim 1 and at least one compatible colorant.

8. A phase change ink composition comprising the phase change ink carrier composition of claim 2 and at least one compatible colorant.

9. The phase change ink composition comprising the phase change ink carrier composition of claim 4 and at least one compatible colorant.

10. The phase change ink carrier composition of claim 1 further including at least one amide compound.

11. The phase change ink carrier composition of claim 1 further including at least one component selected from the group consisting of a urethane resin, a urea resin, a mixed urethane/urea resin and mixtures thereof.

12. The phase change ink carrier composition of claim 1 further including a wax selected from the group consisting of an ester, an amide, a natural wax, a synthetic wax and mixtures thereof.

13. The phase change ink carrier composition of claim 12 further including the wax being a polyethylene wax.

14. The phase change ink carrier composition of claim 1 further including a polycarbonate.

15. A method of printing comprising the steps of:

a. forming an ink from a compatible colorant and an ink carrier composition including a Diels-Alder polymerization precursor, the ink being a low viscosity liquid from about 90° C. to about 160° C., a malleable material from about 80° C. to about 40° C., and a solid below about 30° C.;

b. applying a liquid layer to a support surface, the liquid layer containing one selected from the group consisting of a silicon-containing compound including a dienophile, a natural or synthetic oil containing a dienophile, a silicon-containing compound including a diene and a compatibilizing additive, a natural or synthetic oil containing a compatible diene and a wax containing a compatible diene; and c. applying the ink in image-wise fashion to the liquid layer to cause the ink to react with the liquid layer in a Diels-Alder polymerization reaction to form an image.

16. The method according to claim 15 further comprising the Diels-Alder polymerization reaction precursor being a bis-diene that reacts with the dienophile in the liquid layer.

17. The method according to claim 16 further comprising the silicon-containing compound containing a divinyl silyl compound as the dienophile.

18. The method according to claim 17 further comprising the divinyl silyl compound being 1,3-divinyl-1,3-diphenyl-1,3-dimethyldisiloxane or 1,5-divinyl-3-phenylpentamethyltrisiloxane.

19. The method according to claim 16 further comprising the natural or synthetic oil containing cyclohexanedimethanol divinyl ether as the dienophile.

20. The method according to claim 15 further comprising the Diels-Alder polymerization precursor being a bis-dienophile that reacts with the diene in the liquid layer.

21. The method according to claim 15 further comprising the support surface being a final receiving substrate so that the ink is applied directly to the final receiving substrate.

22. The method according to claim 15 further comprising transferring the image from the support surface to a final receiving substrate.

* * * * *